(12) United States Patent
Hameleers et al.

(10) Patent No.: US 6,377,799 B1
(45) Date of Patent: Apr. 23, 2002

(54) INTERWORKING FUNCTION IN AN INTERNET PROTOCOL (IP)-BASED RADIO TELECOMMUNICATIONS NETWORK

(75) Inventors: Heino Hameleers, Kerkrade (NL); Lee Davidson, McKinney, TX (US); Tore Martin Hagen, Borgen (NO)

(73) Assignee: Ericason Inc., Plano, TX (US)

( * ) Notice: Subject to any disclaimer, the term of this patent is extended or adjusted under 35 U.S.C. 154(b) by 0 days.

(21) Appl. No.: 09/335,806

(22) Filed: Jun. 17, 1999

(51) Int. Cl.$^7$ .................................................. H04J 3/12
(52) U.S. Cl. ........................ 455/426; 370/466; 370/913
(58) Field of Search ................................. 455/403, 418, 455/422, 419, 426, 465; 370/338, 913, 466

(56) References Cited

U.S. PATENT DOCUMENTS

| | | | |
|---|---|---|---|
| 5,802,465 A | * 9/1998 | Hamalainen | ................ 455/403 |
| 6,178,170 B1 | * 1/2001 | Duree | ........................ 370/395 |
| 6,262,992 B1 | * 7/2001 | Nelson | ....................... 370/426 |
| 6,275,574 B1 | * 8/2001 | Oran | ............................ 379/201 |

FOREIGN PATENT DOCUMENTS

EP    0889658 A2    6/1998

OTHER PUBLICATIONS

"Link Layer enhancements for TCP/IP over GSM", Reiner Ludwig (Germany), Bela Rathonyi (Sweden), Mar. 21, 1999.

"Wireless Interworking Architectures to Support Mobile IP over ATM", Ravi Jain, Subhashini Rajagopalan, Li Fung Chang and Vijay Varma, Nov. 3, 1997.

* cited by examiner

*Primary Examiner*—Daniel Hunter
*Assistant Examiner*—Nick Corsaro
(74) *Attorney, Agent, or Firm*—Smith, Danamraj & Youst, P.C.

(57) ABSTRACT

An Internet Protocol (IP)-based radio telecommunications network and method of providing data services to a mobile terminal. An Internet Protocol Shared Interworking Function (IP-SIWF) is implemented in the network, and is controlled from a Mobile Switching Center (MSC) utilizing the Media Gateway Control Protocol (MGCP) device control protocol. When a data call carrying a data payload is originated by a mobile terminal, the data call is transported utilizing radio access and radio link protocols to the IP-SIWF. The radio access and radio link protocols are terminated in the IP-SIWF, and the data payload is transported thereafter utilizing a real time protocol over a User Datagram Protocol (UDP) and an IP protocol layer.

3 Claims, 8 Drawing Sheets

INTERWORKING FUNCTION IN AN INTERNET PROTOCOL (IP)-BASED RADIO TELECOMMUNICATIONS NETWORK

BACKGROUND OF THE INVENTION

1. Technical Field of the Invention

This invention relates to radio telecommunication systems and, more particularly, to a system and method of providing data services in an Internet Protocol (IP)-based Global System for Mobile Communications (GSM) radio telecommunications network.

2. Description of Related Art

In GSM networks, devices for interworking with modems and Integrated Services Digital Network (ISDN) data protocols are located in an Interworking Function (IWF) in the mobile network. The IWF may be integrated with the Mobile Switching Center/Visitor Location Register (MSC/VLR), or may be implemented in a stand-alone manner as a shared IWF. Typically, manufacturers implement a proprietary protocol for use between the IWF and mobile terminals in the network which is basically independent of the fixed network protocol.

The existing network configuration causes problems when attempting to implement GSM data services in Internet Protocol (IP)-based GSM networks. First, in IP-based GSM networks, the payload is not routed through the MSC/VLR; therefore, a traditional implementation of the IWF in the MSC/VLR cannot be utilized. Second, the payload is transported over IP; therefore, even if the IWF is implemented as a stand-alone shared IWF, a GSM-standard (circuit switched) IWF cannot be utilized. The protocols in GSM between the IWF and the mobile station are standardized, but they are separate from the fixed network protocol. Third, the modems and ISDN data protocols are located in a Signaling System 7 (SS7) gateway; however, existing SS7 gateways do not support GSM radio protocols.

There are no known prior art teachings of a solution to the aforementioned deficiencies and shortcomings such as that disclosed herein. It would be advantageous to have a system and method of handling GSM data services in IP-based GSM networks which overcomes the disadvantages of existing solutions. The present invention provides such a system and method.

SUMMARY OF THE INVENTION

In one aspect, the present invention is a method of providing data services in an Internet Protocol (IP)-based radio telecommunications network. The method includes implementing an Internet Protocol Shared Interworking Function (IP-SIWF) in the radio telecommunications network, and controlling the IP-SIWF from a Mobile Switching Center (MSC) utilizing a device control protocol. When a data call carrying a data payload is originated by a mobile terminal, the data call is transported utilizing radio access and radio link protocols to the IP-SIWF. The radio access and radio link protocols are terminated in the IP-SIWF, and the data payload is transported thereafter utilizing a real time protocol (RTP) over a User Datagram Protocol (UDP) and an IP protocol layer.

In another aspect, the present invention is an IP-based radio telecommunications network for providing data services to a mobile terminal. The network includes an MSC serving the mobile terminal, and means for originating a data call carrying a data payload from the mobile terminal utilizing radio access and radio link protocols. An IP-SIWF is connected to the MSC by signaling links and is controlled by the MSC utilizing a device control protocol. The IP-SIWF includes means for terminating the radio access and radio link protocols and transporting the data payload thereafter utilizing a real time protocol over a UDP and an IP protocol layer. The network may also include a Media Gateway and means within the IP-SIWF for sending the data payload to the Media Gateway utilizing a media gateway protocol.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

Figures 1, 1A:
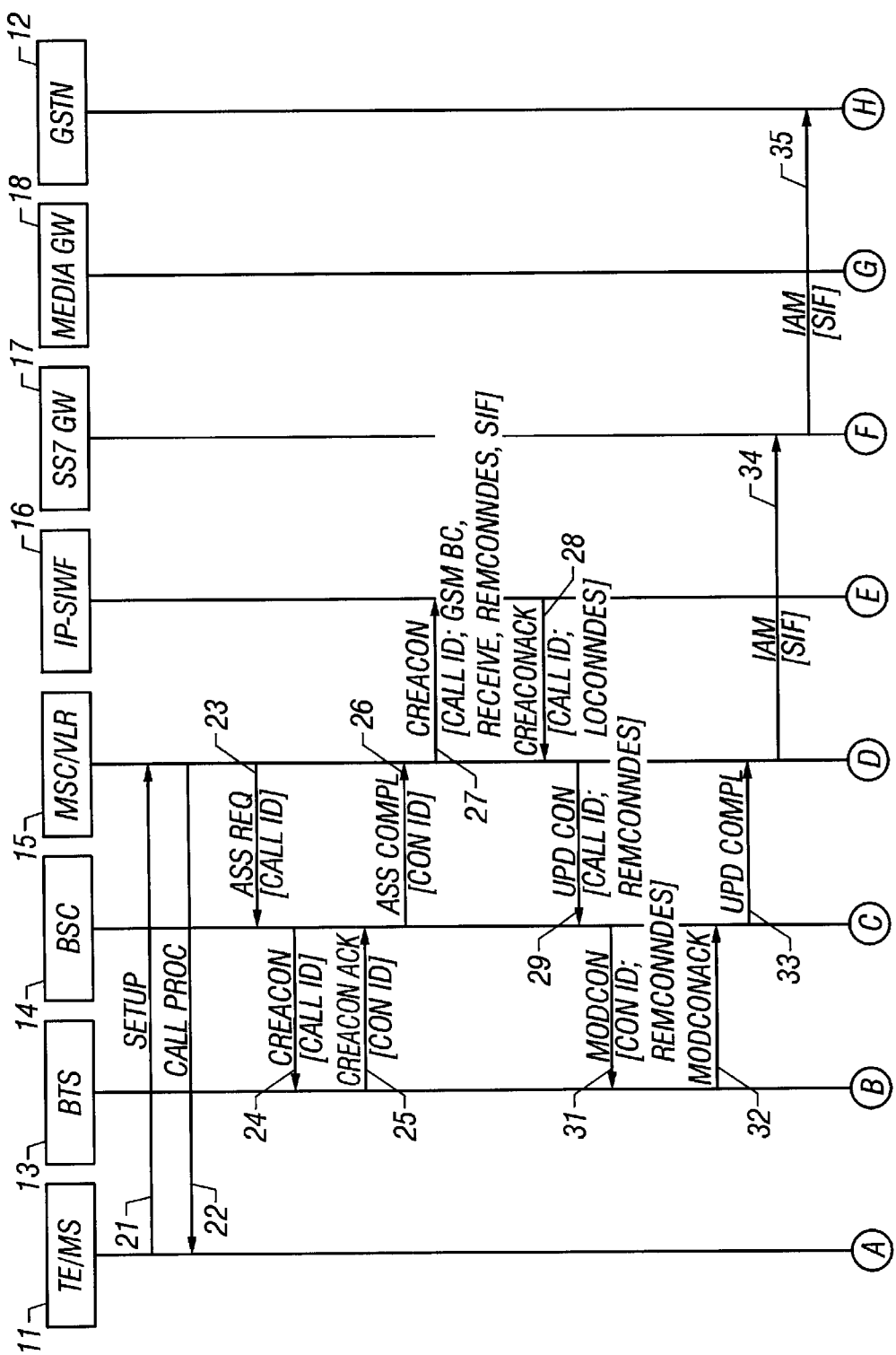
FIG. 1A is a message flow diagram illustrating signaling and payload routing when delivering a mobile-originated data or fax call from a mobile terminal in an IP-based GSM network to a destination in the Global Switched Telephone Network (GSTN) in accordance with the teachings of the present invention.
Figures 1, 1A, 2:
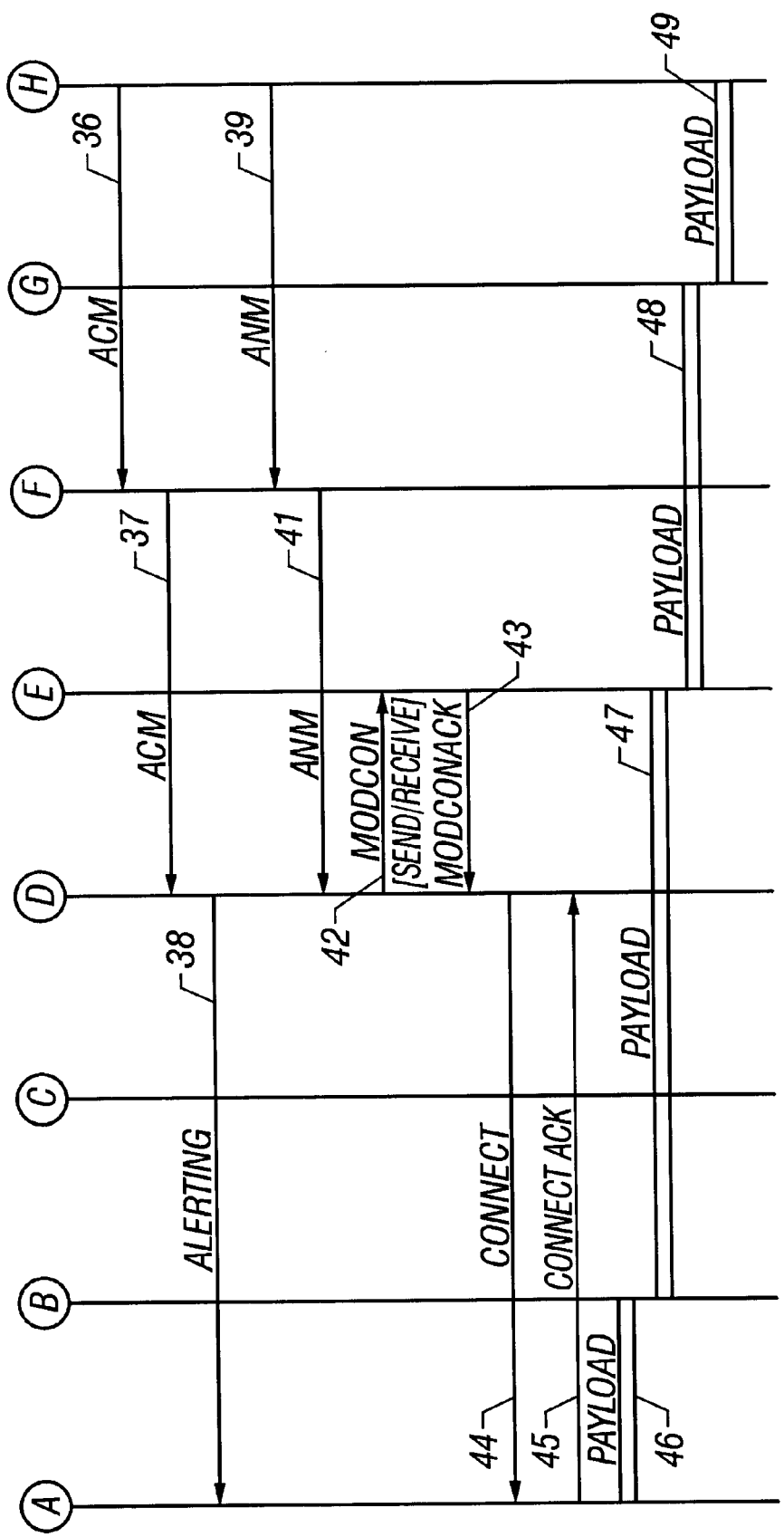

The innovative teachings of the present patent application will be described with particular reference to an exemplary embodiment; however, it should be understood that this embodiment provides only an example of the many advantageous uses of the innovative teachings contained herein. In general, statements made in the specification of the present application do not necessarily limit any of the various claimed aspects of the present invention. Moreover, some statements may apply to some inventive features but not to others.

In the drawings, like or similar elements are designated with identical reference numerals throughout the several views, and the various elements depicted are not necessarily drawn to scale.

The present invention introduces a new logical node in the IP-based GSM network which is referred to herein as an Internet Protocol Shared Interworking Function (IP-SIWF). The IP-SIWF terminates the GSM radio protocols and sends the payload to a Media Gateway in a protocol supported by the particular Media Gateway, for example, High-level Data Link Control (HDLC) over IP. The IP-SIWF is controlled by a MSC/VLR utilizing a device control protocol such as the Media Gateway Control Protocol (MGCP). Implementation of the IP-SIWF provides (1) a way to support a non-GSM compliant Media Gateway for GSM data services, and (2) a way to use MGCP in an IP-based GSM network to control data bearers. The invention moves the IWF out of the MSC (which necessitates a device control protocol), and the payload is then carried over an IP packet network instead of a circuit switched connection.

Existing GSM networks may include a shared interworking function (SIWF) which is not in the MSC. The difference between the functionality of the existing SIWF and the IP-SIWF of the present invention is that the existing SIWF uses a combination of Mobile Application Part (MAP) and Integrated Services User Part (ISUP) protocols. A MAP sequence is first used to obtain a route to a SIWF. Once the SIWF is selected, an ISUP connection is set up through the SIWF. The MAP sequence includes some GSM-specific parameters such as GSM Bearer Capabilities. This enables a single SIWF to be implemented for a network rather than implementing an IWF in each MSC. However, within the GSM network, the SIWF is still circuit-switched based. Also, a call may need to come out of the mobile network at several locations, and this would require multiple SIWFs. The present invention provides this functionality with one IP-SIWF. The present invention replaces both the MAP and the ISUP protocols with the MGCP device control protocol as a mechanism for controlling the SIWF. This protocol is very open, and there are no problems with parameters that do not fit in any protocol. The MAP and ISUP protocols are terminated instead at the MSC which uses the MGCP protocol for control of the SIWF.

Referring to FIG. 1A, there is shown a message flow diagram illustrating signaling and payload routing when delivering a mobile-originated data or fax call from a terminal equipment/mobile station (TE/MS) 11 in an IP-based GSM network to a local exchange or terminal equipment in the Global Switched Telephone Network (GSTN) 12 in accordance with the teachings of the present invention. The IP-based GSM network is shown to include a Base Transceiver Station (BTS) 13, a Base Station Controller (BSC) 14, a Mobile Switching Center/Visitor Location Register (MSC/VLR) 15, an IP-SIWF 16, a SS7 Gateway (GW) 17, and a Media Gateway 18. The illustrated message flow is exemplary only, and is based on the MGCP device control protocol. In particular, messages between the MSC/VLR 15 and the BSC 14, between the BSC and the BTS 13, and between the MSC/VLR and the IP-SIWF 16 are illustrated as MGCP messages, but other device control protocols such as the Media Device Control Protocol (MDCP) from Lucent Technologies may also be utilized. Standards organizations such as ITU have formed working groups to define a standardized gateway control protocol (h.gcp) which may also be utilized in the present invention.

At 21, a Setup message is sent from the TE/MS 11 to the MSC/VLR 15. The MSC/VLR then responds with a Call Proceeding message 22. The MSC/VLR also sends an Assignment Request (ASS REQ) message 23 with a Call ID to the BSC 14. The BSC sends a Create Connection (CreaCon) message 24 with the Call ID to the BTS 13. The BTS then responds with a Create Connection Accepted (CreaConAck) message 25 with a Connection ID. The BSC then sends an Assignment Complete (ASS COMPL) message 26 to the MSC/VLR and includes the Connection ID.

The MSC/VLR 15 then sends a Create Connection (CreaCon) message 27 with the Call ID, GSM Bearer Capabilities (BC), a direction (receive), a Remote Connection Description (RemConnDes), and a Signaling Information Field (SIF) to the IP-SIWF 16. The IP-SIWF responds with a Create Connection Accepted (CreaConAck) message 28 and includes a Connection ID and a Local Connection Description (LocConnDes). The MSC/VLR then sends an Update Connection (UPD CON) message 29 with the Call ID and the Remote Connection Description to the BSC 14. The BSC sends a Modify Connection (ModCon) message 31 with the Connection ID and the Remote Connection Description to the BTS 13. When the BTS is ready to receive payload packets from the IP-SIWF, the BTS sends a Modify Connection Accepted (ModConAck) message 32 to the BSC. The BSC then sends an Update Complete message 33 to the MSC/VLR.

At 34, the MSC/VLR 15 sends an Initial Address Message (IAM) with the SIF to the SS7 Gateway 17. At 35, the SS7 Gateway, in turn, sends the IAM to the GSTN destination 12. The GSTN responds by returning an Address Complete Message (ACM) 36. At 37, the SS7 Gateway then sends the Address Complete Message to the MSC/VLR. The MSC/VLR responds by sending an alerting signal 38 to the TE/MS 11.

At 39, the GSTN 12 sends an Answer Message (ANM) 39 to the SS7 Gateway 17. At 41, the SS7 Gateway sends the Answer Message to the MSC/VLR 15. The MSC/VLR then sends a Modify Connection message 42 with a direction (send/receive) to the IP-SIWF 16. The IP-SIWF responds with a Modify Connection Accepted (ModConAck) message 43. The MSC/VLR then sends a Connection message 44 to the TE/MS 11 which responds with a Connection Acknowledgment message 45. The payload is then carried from the TE/MS to the GSTN destination at 46–49. From the TE/MS, the payload is transmitted at 46 over the standard GSM air interface to the BTS. The BTS converts the payload to IP packets, and the payload is carried over an IP packet network at 47 and 48 via the IP-SIWF to the Media Gateway. The Media Gateway converts the payload to circuit-switched GSTN format and sends the payload to the GSTN destination at 49.

Figure 1B:
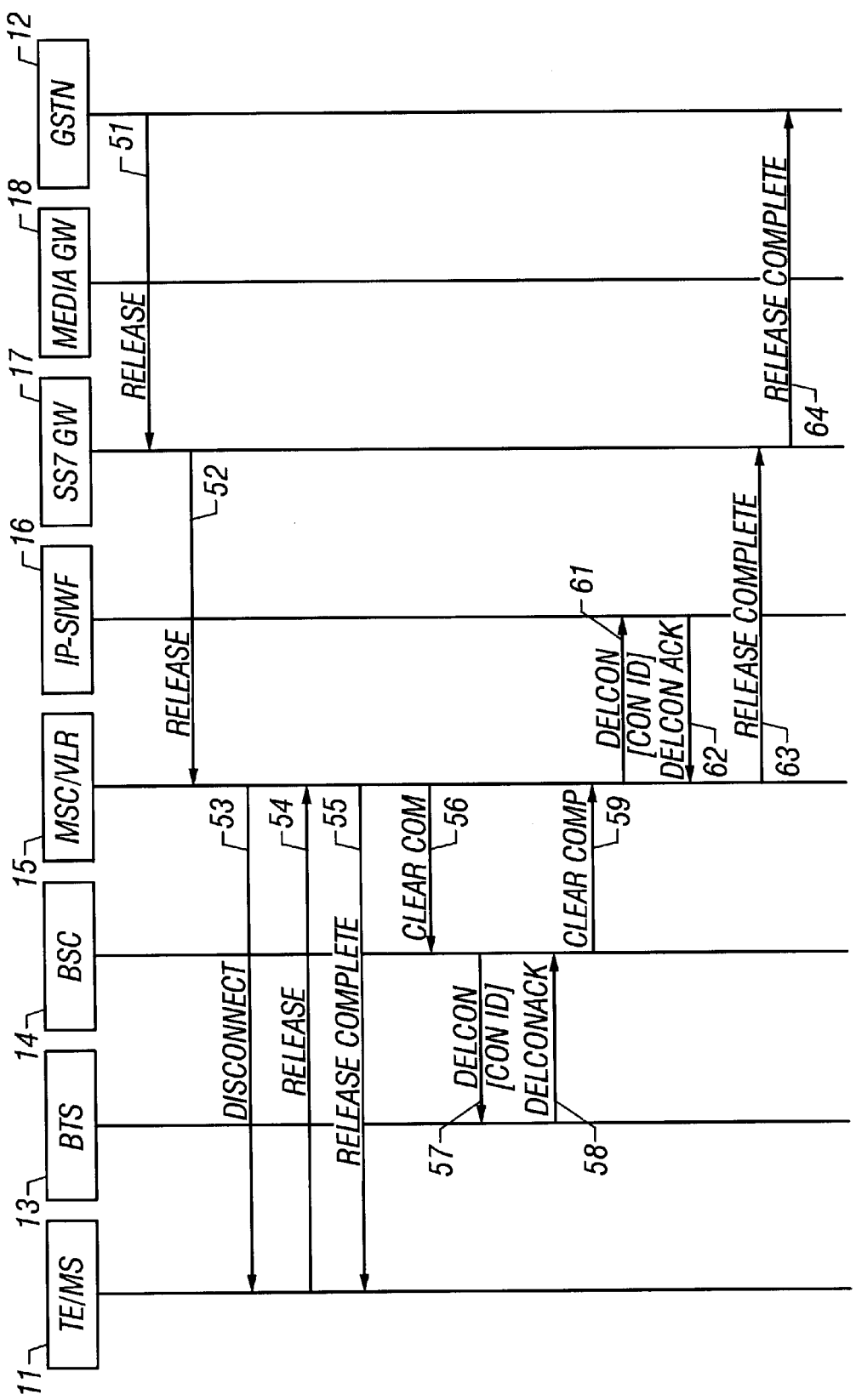
FIG. 1B is a message flow diagram illustrating a release sequence when concluding the mobile-originated data or fax call of FIG. 1A.

Referring now to FIG. 1B, there is shown a message flow diagram illustrating a release sequence when concluding the mobile-originated data or fax call of FIG. 1A. At 51, the terminating equipment or local exchange in the GSTN 12 sends a Release message to the SS7 Gateway 17. At 52, the Release message is forwarded to the MSC/VLR 15. The MSC/VLR then sends a Disconnect message 53 to the TE/IMS 11 which returns a Release message to the MSC/VLR at 54. The MSC/VLR then sends a Release Complete message 55 to the TE/MS and sends a Clear Command message 56 to the BSC 14. The BSC sends a Delete Connection (DelCon) message 57 to the BTS 13 with a Connection ID, and the BTS returns a Delete Connection Accepted (DelConAck) message 58. The BSC then sends a Clear Complete message 59 to the MSC/VLR.

At 61, the MSC/VLR 15 sends a Delete Connection message to the IP-SIWF 16 with the Connection ID, and the IP-SIWF returns a Delete Connection Accepted message 62. The MSC/VLR then sends a Release Complete message 63 to the SS7 Gateway 17. At 64, the SS7 Gateway forwards the Release Complete message to the GSTN 12, and the release sequence is concluded.

Figures 1, 2A:
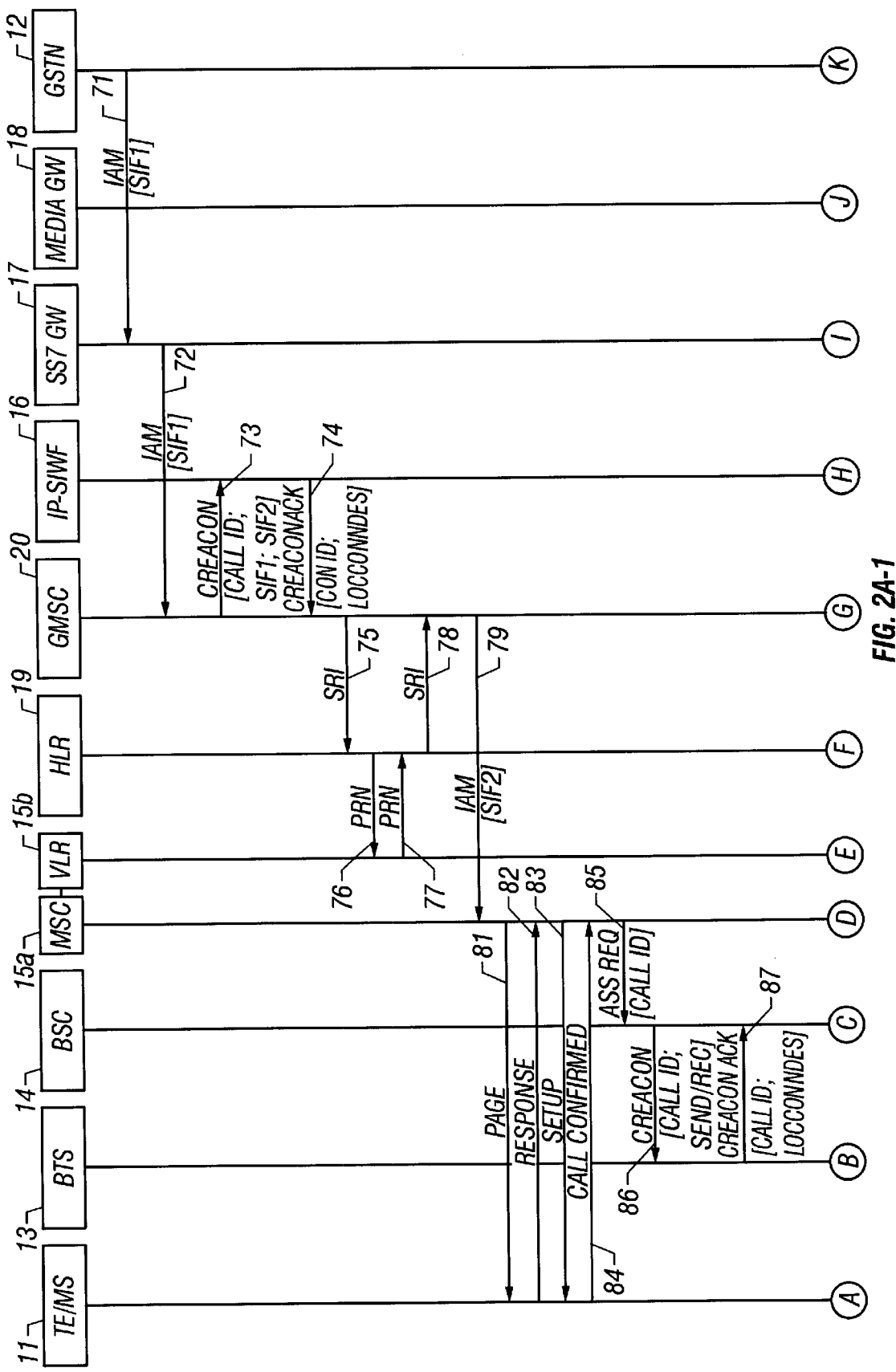
FIGS. 2A–2B are a message flow diagram illustrating signaling and payload routing when delivering a mobile-terminating data or fax call from the GSTN to a mobile terminal in an IP-based GSM network in accordance with the teachings of the present invention.
Figures 2, 2A:
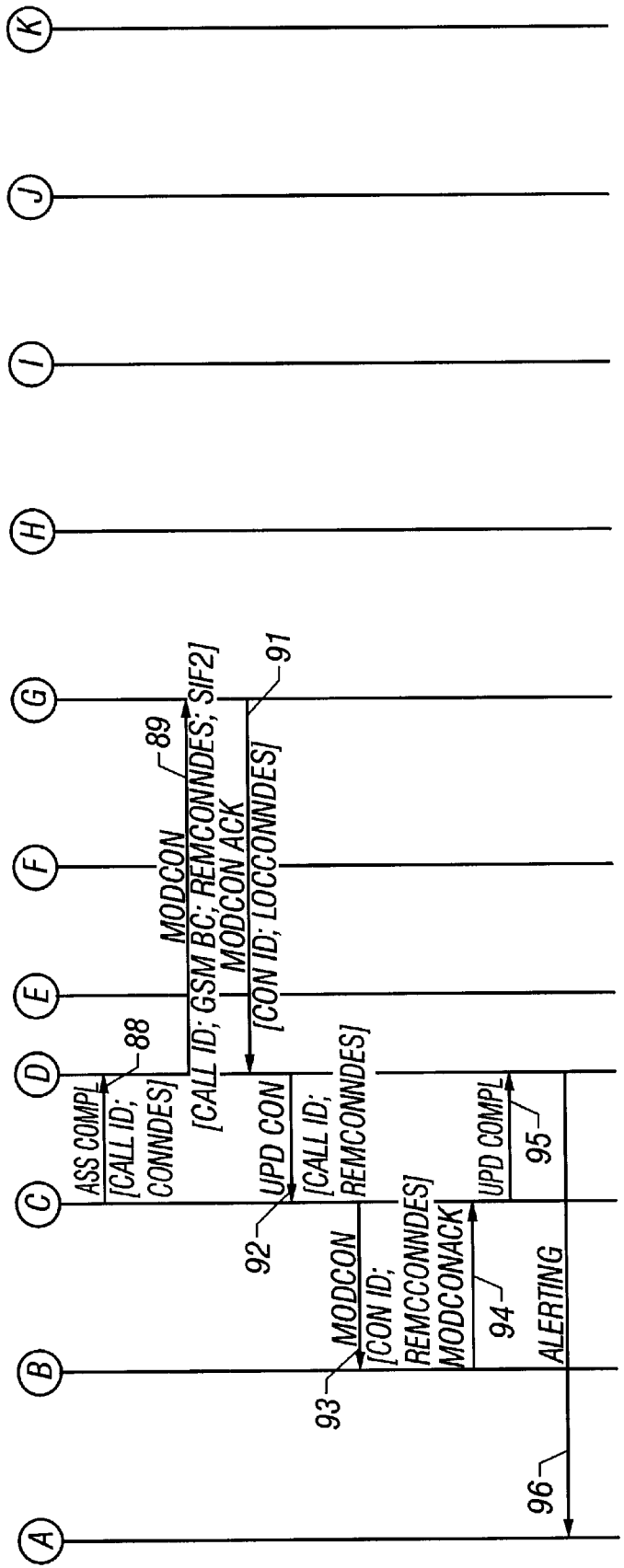
Figure 2B:
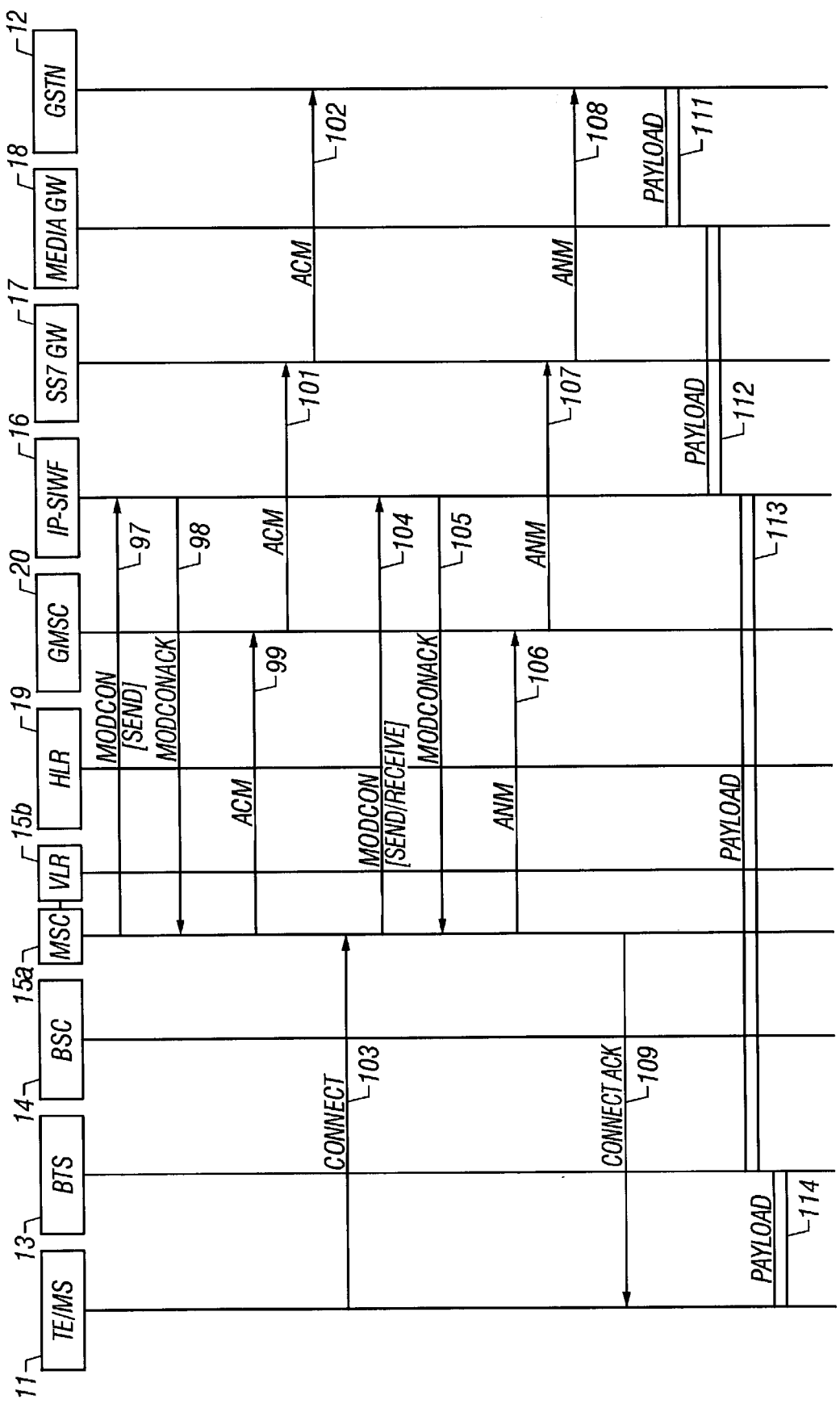

FIGS. 2A–2B are a message flow diagram illustrating signaling and payload routing when delivering a mobile-terminating data or fax call from the GSTN 12 to the TE/MS 11 in an IP-based GSM network in accordance with the teachings of the present invention. In general, initial call setup is performed through a GMSC 20 which queries the HLR 19 for location information so that the IAM can be routed to the proper MSC. The GMSC 20 is reached by the GSTN 12 by sending the Destination Point Code (DPC) of the GMSC to the SS7 Gateway 17 in Message Transfer Protocol (MTP). The SS7 Gateway then determines the IP address based on the DPC (fixed relation). The SS7 Gateway relays the ISUP layer to the GMSC. The MSC 15a determines the Media Gateway address and the Call ID from the Circuit Identity Code (CIC) it receives from the GMSC, and the IP-SIWF 16 terminates the radio links.

Referring first to FIG. 2A, at 71, the GSTN 12 sends an Initial Address Message (IAM) with a first Signaling Information Field (SIF1) to the SS7 Gateway 17. At 72, the SS7 Gateway determines the IP address and sends the IAM to the GMSC 20. The GMSC responds by returning a Create Connection (CreaCon) message 73 with a Call ID, SIF1, and a second SIF (SIF2) to the IP-SIWF 16. The IP-SIWF responds with a Create Connection Accepted (CreaConAck) message 74 and includes a Connection ID and a Local Connection Description (LocConnDes).

The GMSC then sends a Select Route Invoke (SRI) message 75 to the HLR 19 which, in turn, sends a Provide Routing Number (PRN) Invoke message 76 to the VLR 15b. The VLR returns a routing number in a PRN Return Result message 77, and at 78, the HLR sends a SRI Return Result message to the GMSC. At 79, the GMSC sends an IAM to the MSC 15a and includes SIF2. The MSC pages for the TE/MS 11 at 81, and receives a response at 82. The MSC sends a Setup message to the TE/MS at 83, and receives a Call Confirmed message at 84.

At 85, the MSC 15a sends an Assignment Request (ASS REQ) message with the Call ID to the BSC 14. The BSC sends a Create Connection (CreaCon) message 86 with the Call ID and a send/receive indication to the BTS 13. The BTS then responds with a Create Connection Accepted (CreaConAck) message 87 and includes a Connection ID and a Local Connection Description (LocConnDes). The BSC then sends an Assignment Complete (ASS COMPL) message 88 to the MSC/VLR and includes the Connection ID and a connection description.

At 89, the MSC 15a then sends a Modify Connection (ModCon) message to the IP-SIWF 16 and includes the Call ID, GSM Bearer Capabilities (BC), a Remote Connection Description (RemConnDes), and SIF2. The IP-SIWF responds with a Modify Connection Accepted (ModConAck) message 91 and includes a Connection ID and a Local Connection Description (LocConnDes). The MSC then sends an Update Connection (UPD CON) message 92 with the Call ID and the Remote Connection Description to the BSC 14. The BSC sends a ModCon message 93 with the Connection ID and the Remote Connection Description to the BTS 13. When the BTS is ready to receive payload packets from the IP-SIWF, the BTS sends a ModConAck message 94 to the BSC. The BSC then sends an Update Complete message 95 to the MSC. The MSC then begins alerting the TE/MS at 96.

Referring now to FIG. 2B, the process continues at step 97 where the MSC 15a sends a ModCon message to the IP-SIWF 16 and includes a Send indication. The IP-SIWF returns a ModConAck message at 98. At 99, the MSC sends an Address Complete Message (ACM) to the GMSC which forwards the ACM at 101 to the SS7 Gateway 17. At 102, the SS7 Gateway sends the ACM to the terminal equipment in the GSTN 12 which is originating the data call.

The TE/MS 11 answers the alert signal 96 by sending a Connect message 103 to the MSC 15a. At 104, the MSC sends a ModCon message to the IP-SIWF 16 and includes Send and Receive indications. At 105 the IP-SIWF returns a ModConAck message to the MSC. At 106, the MSC sends an Answer Message (ANM) to the GMSC which forwards the ANM at 107 to the SS7 Gateway 17. At 108, the SS7 Gateway sends the ANM to the terminal equipment in the GSTN 12 which is originating the data call. The MSC then sends a Connection Acknowledgment message 109 to the TE/MS. The payload is then carried from the GSTN 12 to the TE/MS 11 in steps 111 through 114. Between the GSTN and the Media Gateway at 111, the payload is still in the circuit-switched GSTN format. The Media Gateway converts the payload to IP packets, and the payload is carried over an IP packet network at 112 and 113. At the BTS, the payload is converted to the standard GSM air interface for transmission to the TE/MS at 114.

The release sequence for the mobile-terminating data or fax call is the same as for the mobile-originated data or fax call, as shown in FIG. 1B.

Figure 3:
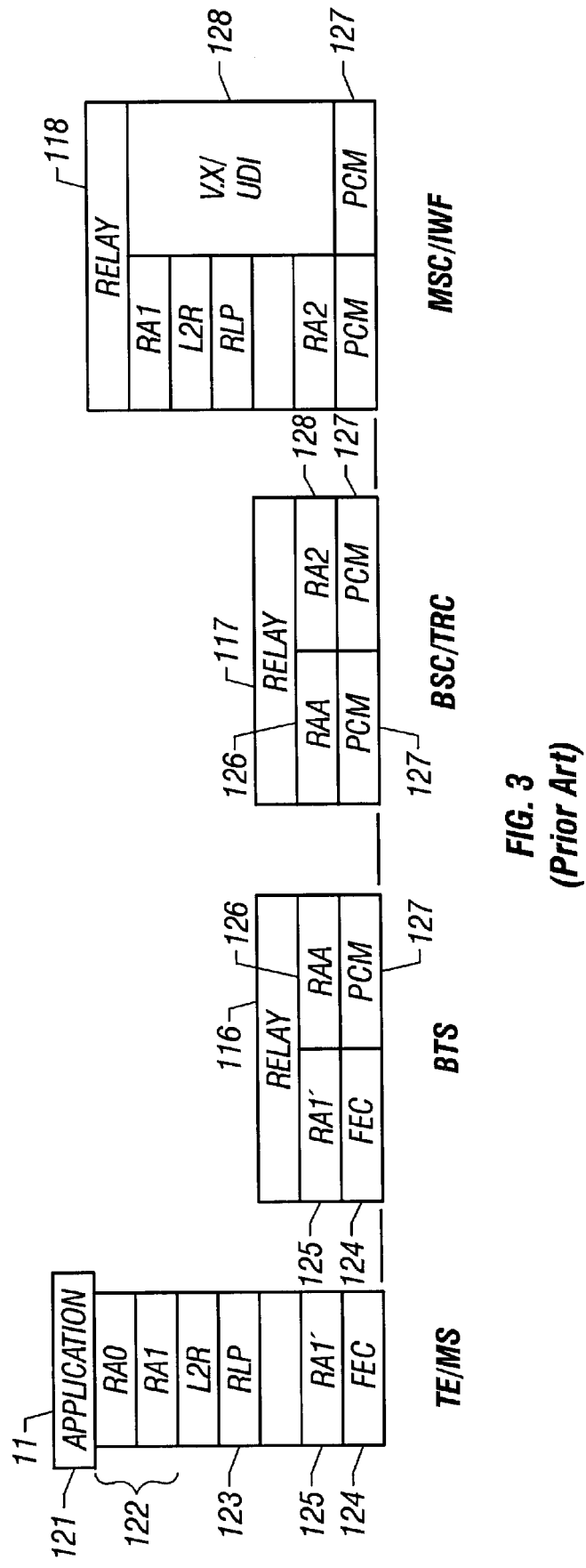
FIG. 3 (Prior Art) is an illustrative drawing of the existing protocol stacks utilized for non-transparent communication of circuit switched data between the various components of a GSM network.

FIG. 3 is an illustrative drawing of the existing protocol stacks utilized for non-transparent communication of circuit switched data between the various components of a GSM network. The protocol stacks are bi-directional, and flow from either direction through the stacks. The prior art network includes the TE/MS 11, and a BTS 116, a Base Station Controller/Transcoding Center (TRC) 117, and a combined Mobile Switching Center/Interworking Function (MSC/IWF) 118. The TE/MS 11 is shown to utilize an application layer 121 and various standard Radio Access (RA) Protocols 122 and a Radio Link Protocol (RLP) layer 123. The stack is built on a Forward Error Correction (FEC) layer 124 and a Radio Access layer (RA1') 125.

In the BTS 116, the RA1' layer 125 is replaced by another Radio Access layer (RAA) 126, and the FEC layer 124 is replaced by a Pulse Code Modulation (PCM) layer 127. The PCM layer carries the transmission through the BSC/TRC 117 and the MSC/IWF 118. In the BSC/TRC, the RAA layer 126 is replaced by an RA2 Radio Access layer 128. In the MSC/IWF, the layers above the PCM layer are replaced by an ITU-T standard V.x/UDI (Unrestricted Digital Information) layer 129 which is used to interface with the target data network.

Figure 4:
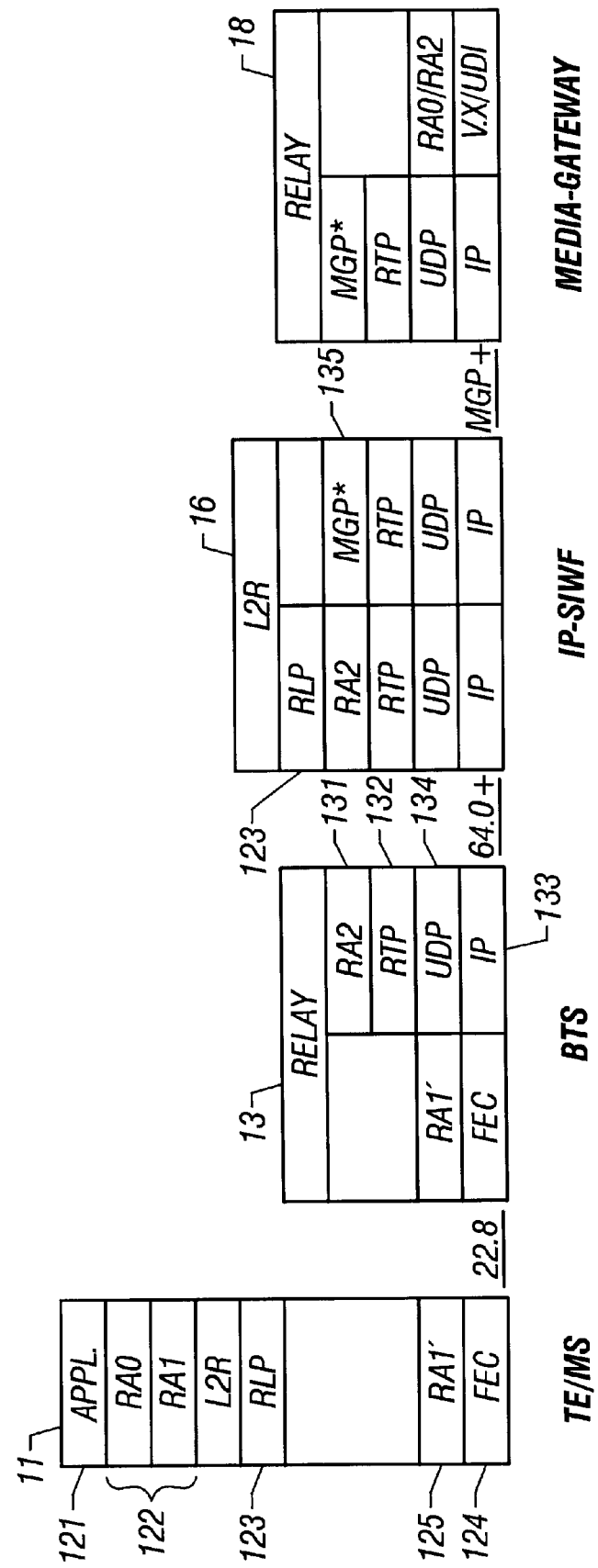
FIG. 4 is an illustrative drawing of the protocol stacks utilized for non-transparent communication of circuit switched data between the various components of the IP-based GSM network when modified in accordance with the teachings of the present invention.

FIG. 4 is an illustrative drawing of the protocol stacks utilized for non-transparent communication of circuit switched data between the various components of the IP-based GSM network when modified in accordance with the teachings of the present invention. The protocol stacks are bi-directional, and flow from either direction through the stacks. The TE/MS 11, which is not modified, is shown to utilize the application layer 121 and various standard Radio Access (RA) Protocols 122 and the RLP layer 123. The stack is built on the FEC layer 124 and the Radio Access layer (RA1') 125.

In the BTS 13, an additional Radio Access protocol (RA2) 131 is added on top of a Real Time Protocol (RTP) 132. Both of these protocols are placed on top of an Internet Protocol (IP) layer 133 and a User Datagram Protocol (UDP) 134. The IP layer and the UDP layer replace the FEC layer and the RA1' layer, respectively. The RLP layer 123 is relayed through the BTS. From this point on, the present invention carries the data payload over UDP, IP, and RTP layers.

In the IP-SIWF 16, the RLP layer 123 is terminated. In addition, the RA2 layer is replaced by a Media Gateway Protocol (MGP) layer 135 which is utilized for communications with the Media Gateway 18. The MGP layer may be, for example, High-level Data Link Control (HDLC) over IP. The Media Gateway, in turn, provides the payload to the destination network.

The present invention moves GSM from a circuit switched environment to a wide area IP environment. When this is done, additional advantages are realized. Devices currently implemented in GSM circuit switched nodes can be moved elsewhere in the network. For example, the devices may be moved to the edge of the network which may be in another country or in a more advantaged location due to tariffs or transmission efficiency, etc. For example, transcoders which carry GSM speech over the air interface at 16 kbps can be moved from the TRC node to the edge of the network where they are needed to provide interworking with, for example, the PSTN. Encoded speech can then be carried throughout the network at 16 kbps rather than 64 kbps (a 4X improvement in transmission efficiency).

For circuit switched data, existing GSM networks include a device which is similar to the voice transcoders, and which is implemented in the IWF in the MSC. It includes a modem pool, and terminates the radio link protocol on the radio side of the data communications protocol. The present invention moves this device out of the MSC thereby converting the MSC to a purely software node which controls other nodes in the IP network. By implementing a suitable device control protocol, the present invention enables the IWF to be moved to the edge of the network where protocols can be advantageously terminated.

It is thus believed that the operation and construction of the present invention will be apparent from the foregoing description. While the network and method shown and described has been characterized as being preferred, it will be readily apparent that various changes and modifications could be made therein without departing from the scope of the invention as defined in the following claims.

What is claimed is:

1. In Internet Protocol (IP)-based Global System for Mobile Communications (GSM) radio telecommunications network having a Mobile Switching Center (MSC) and a non-GSM compliant Media Gateway, a method of providing GSM data services between a GSM mobile terminal and a destination terminal equipment (TE) operating in a circuit-switched network, said method comprising the steps of:

implementing an Internet Protocol Shared Interworking Function (IP-SIWF) in the GSM radio telecommunications network;

controlling the IP-SIWF from the MSC utilizing a device control protocol;

originating a GSM data call from the mobile terminal, said data call carrying a data payload utilizing GSM radio access and radio link protocols;

terminating the GSM radio link protocol in the IP-SIWF;

replacing the GSM radio access protocol in the IP-SIWF with a media gateway protocol that is compatible with the non-GSM compliant Media Gateway; and transporting the data payload from the IP-SIWF to the non-GSM compliant Media Gateway utilizing the media gateway protocol and a real time protocol (RTP) over a User Datagram Protocol (UDP) and an IP protocol layer.

2. The method of providing GSM data services of claim 1 wherein the step of replacing the GSM radio access protocol with a media gateway protocol includes replacing the GSM radio access protocol with a High Level Data Link Control (HLDLC) protocol.

3. An Internet Protocol (IP)-based radio telecommunications network for providing Global System for Mobile Communications (GSM) data services between a GSM mobile terminal and a destination terminal equipment (TE) operating in a circuit-switched network, said network comprising:

a Mobile Switching Center (MSC) serving the mobile terminal;

means for originating a GSM data call from the mobile terminal, said data call carrying a data payload utilizing GSM radio access and radio link protocols;

a non-GSM compliant Media Gateway providing access to the circuit-switched network in which the destination TE is operating; and an Internet Protocol Shared Interworking Function (IP-SIWF) connected to the MSC by signaling links and controlled by the MSC utilizing a device control protocol, said IP-SIWF including:

means for terminating the GSM radio link protocol, means for replacing the GSM radio access protocol with a media gateway protocol that is compatible with the non-GSM compliant Media Gateway, and means for transporting the data payload from the IP-SIWF to the non-GSM compliant Media Gateway utilizing the media gateway protocol and a real time protocol over a User Datagram Protocol (UDP) and an IP protocol layer.

\* \* \* \* \*